US007844246B2

(12) United States Patent  (10) Patent No.: US 7,844,246 B2
Groskreutz et al.  (45) Date of Patent: Nov. 30, 2010

(54) METHOD AND SYSTEM FOR COMMUNICATIONS BETWEEN A TELEMATICS CALL CENTER AND A TELEMATICS UNIT

(75) Inventors: Bruce A. Groskreutz, Grand Blanc, MI (US); Thomas A. Gault, Clawson, MI (US); Daniele Nicolini, Livonia, MI (US)

(73) Assignee: General Motors LLC, Detroit, MI (US)

( * ) Notice: Subject to any disclaimer, the term of this patent is extended or adjusted under 35 U.S.C. 154(b) by 932 days.

(21) Appl. No.: 10/850,303

(22) Filed: May 20, 2004

(65) Prior Publication Data

US 2005/0261035 A1 Nov. 24, 2005

(51) Int. Cl.
*H04M 11/04* (2006.01)
*H04W 24/00* (2009.01)
(52) U.S. Cl. .............. 455/404.1; 455/404.2; 455/456.1; 455/456.3; 455/456.2
(58) Field of Classification Search .................... 455/99, 455/100, 41.2, 456.3, 414.3, 433, 404.1, 455/403; 379/37–51; 340/287–309
See application file for complete search history.

(56) References Cited

U.S. PATENT DOCUMENTS

| | | | | |
|---|---|---|---|---|
| 5,937,355 A * | 8/1999 | Joong et al. ................. 455/466 |
| 6,035,187 A * | 3/2000 | Franza ..................... 455/404.1 |
| 6,295,449 B1 * | 9/2001 | Westerlage et al. ....... 455/422.1 |
| 6,778,826 B2 * | 8/2004 | Rankin ........................ 455/433 |
| 7,209,947 B1 * | 4/2007 | Lee et al. ..................... 709/204 |
| 7,323,973 B1 * | 1/2008 | Ceglia et al. ................ 340/436 |
| 7,509,134 B2 * | 3/2009 | Fournier et al. .......... 455/456.1 |
| 2003/0126330 A1 * | 7/2003 | Balasuriya .................. 710/107 |
| 2004/0185800 A1 * | 9/2004 | Van Bosch et al. ............ 455/99 |
| 2005/0094775 A1 * | 5/2005 | Smith et al. ................... 379/52 |
| 2006/0026001 A1 * | 2/2006 | Bravin et al. ............. 704/270.1 |

* cited by examiner

*Primary Examiner*—Charles N Appiah
*Assistant Examiner*—Emem Stephen
(74) *Attorney, Agent, or Firm*—Anthony L. Simon; Reising Ethington P.C.

(57) ABSTRACT

The invention provides a method and system for communicating between a telematics call center and a telematics unit. A service communication is initiated from a telematics unit to a telematics call center responsive to user input. A text-based acknowledgment is received at the telematics unit from the call center in response to the initiation. A communication mode is established based on communication preference data in response to the acknowledgement. The method and system further comprises providing the communication preference data to the call center. A computer usable medium with suitable computer program code is employed for communicating between a telematics call center and a telematics unit.

9 Claims, 2 Drawing Sheets

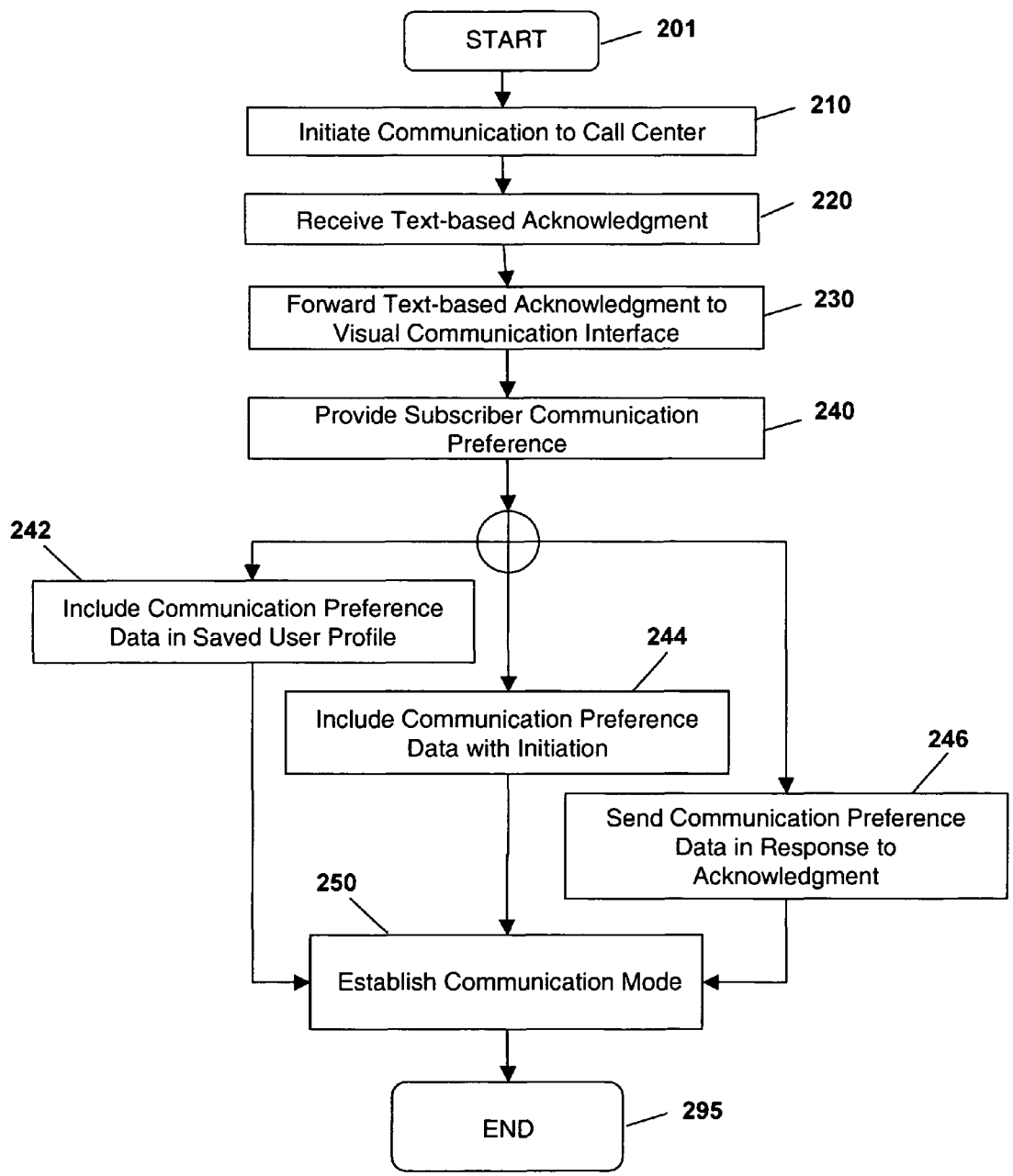

METHOD AND SYSTEM FOR COMMUNICATIONS BETWEEN A TELEMATICS CALL CENTER AND A TELEMATICS UNIT

FIELD OF THE INVENTION

This invention relates generally to telematics-based communications. In particular the invention relates to establishing communication between a telematics call center and a telematics unit.

BACKGROUND OF THE INVENTION

Information and interactive services available to mobile vehicles are increasing due to the demand of mobile vehicle operators for services such as navigation assistance, directory assistance, vehicle maintenance assistance, roadside assistance, information services assistance, and emergency assistance. These services are accessible via interfaces such as voice-recognition computer applications, touch-screen computer displays, computer keyboards, and a series of buttons on the dashboard or console of a vehicle.

Hearing-impaired telematics subscribers are limited in their access to telematics service due to the traditional voice-based telematics interface. When establishing communications between a telematics call center and a telematics subscriber who is hearing impaired or who has a speech disability, normal voice communication is usually not effective.

Various solutions exist for people with disabilities to utilize telephone communications. For example, many hearing-impaired people utilize TTY/TTD/TTD (Telecommunication Device for the Deaf) equipment when communicating using land-line phones. Persons with severe to profound hearing loss who prefer to communicate verbally can utilize a voice-carryover TTY/TTD. A voice-carryover TTY/TTD is a text telephone with an amplified handset. The voice-carryover TTY/TTD is used as a standard telephone or is used to communicate with another TTY/TTD user or with a relay service for voice-carryover calls. In another example, persons who can hear but cannot speak can utilize a hearing-carryover TTY/TTD with speakers. The hearing-carryover TTY/TTD allows the user to receive voice and send text.

In addition to TDD, a number of pieces of additional equipment can be coupled to telephones to improve their utility. For those with hearing difficulties, the telephone ring and conversation sound level can be amplified or pitch adjusted; ambient noise can also be filtered. The amplifier can be a simple addition or interact with suitable hearing aids through an inductive coupler. The ring can also be supplemented with extension bells or a visual call indicator. These various solutions can also be utilized by drivers with disabilities in a telematics-equipped vehicle.

Interfaces must be provided among the various pieces of equipment available to a hearing-impaired subscriber and the telematics equipment installed in a vehicle. In addition, communication to the call center of a subscriber's communication preferences must be facilitated.

It is therefore desirable to provide a method and system for communications between a telematics call center and a telematics unit that overcomes the limitations, challenges, and obstacles described above.

SUMMARY OF THE INVENTION

One aspect of the present invention provides a method for communicating between a telematics call center and a telematics unit. A service communication is initiated from a telematics unit to a telematics call center responsive to user input. A text-based acknowledgment is received at the telematics unit from the call center in response to the initiation. A communication mode is established based on communication preference data in response to the acknowledgement.

Another aspect of the present invention provides a system for communicating between a telematics call center and a telematics unit, the system comprising means for initiating a service communication from a telematics unit to a telematics call center responsive to user input, means for receiving a text-based acknowledgment at the telematics unit from the call center in response to the initiation, and means for establishing a communication mode based on communication preference data in response to the acknowledgement.

A third aspect of the present invention provides a computer usable medium storing a computer program including computer program code for communicating between a telematics call center and a telematics unit comprising computer program code for initiating a service communication from a telematics unit to a telematics call center responsive to user input, computer program code for receiving a text-based acknowledgment at the telematics unit from the call center in response to the initiation, and computer program code for establishing a communication mode based on communication preference data in response to the acknowledgement.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flowchart representative of one embodiment of a method for communicating between a telematics call center and a telematics unit in accordance with the present invention.

DETAILED DESCRIPTION OF THE PRESENTLY PREFERRED EMBODIMENTS

Figure 1:
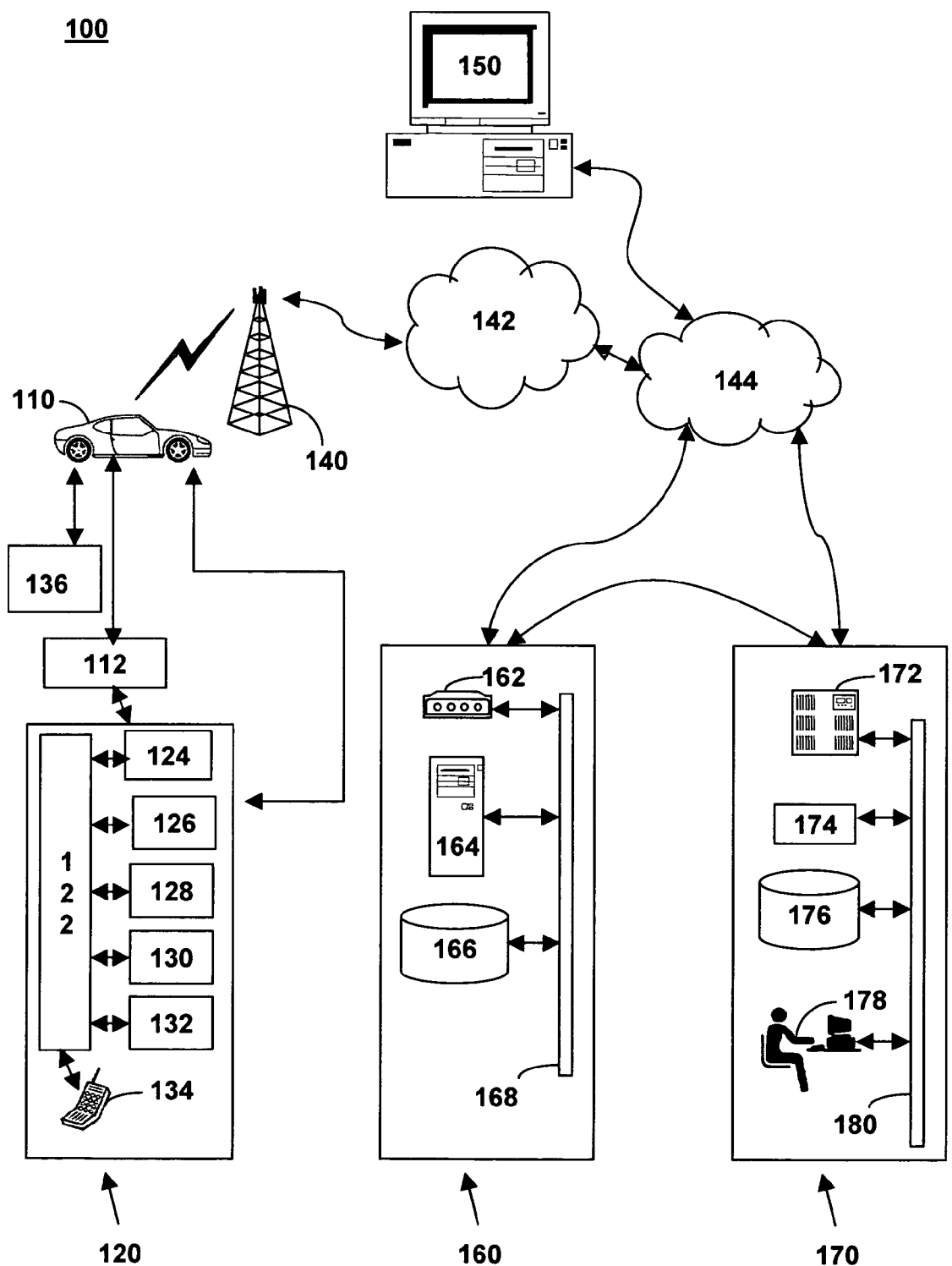
FIG. 1 is a schematic diagram of one embodiment of a system for communicating between a telematics call center and a telematics unit in accordance with the present invention.

FIG. 1 illustrates one embodiment of a system for communicating between a telematics call center and a telematics unit, in accordance with the present invention at 100. The communication system includes a mobile vehicle communication unit (MVCU) 110; a vehicle communication network 112; a telematics unit 120; one or more wireless carrier systems 140; one or more communication networks 142; one or more land networks 144; one or more client, personal, or user computers 150; one or more web-hosting portals 160; and one or more call centers 170. In one embodiment, MVCU 110 is implemented as a mobile vehicle equipped with suitable hardware and software for transmitting and receiving voice and data communications. A display may be embedded in MVCU 110. The display may be a dialed digital display such as a radio unit or an instrument panel. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, GPS unit 126 or speakers 132. Telematics unit 120 may include additional components not relevant to the present discussion.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet-browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior; radio station preset selections; climate controls; custom button configurations; theft alarm settings; and a preference for text/text, text/voice, voice/text, or voice/voice communication. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center provides text communications between an advisor in the call center and a subscriber in a mobile vehicle. In yet another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal or text communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144, and web-hosting portal 160 using voice or data transmissions. In an alternative embodiment, communication services manager 174 communicates with telematics unit 120 in MVCU 110 through wireless carrier system 140, communication network 142, land network 144, and web-hosting portal 160 using voice or data transmissions. Switch 172 selects between voice transmissions and data transmissions.

In one embodiment, MVCU 110 includes communication equipment 136 designed for alternative modes of communication between the call center 170 and the telematics unit 120. Any subscriber, but especially those subscribers with hearing or speech disabilities, can utilize communication equipment 136. Examples of communication equipment include TDD, a voice-carryover device, and a hearing-carryover device. Communication equipment 136 installed in MVCU 110 is integrated with or coupled to the telematics unit 120 or in-vehicle mobile phone 134. In another embodiment, communication equipment 136 includes wireless functionality independent of telematics unit 120 or in-vehicle phone 134.

FIG. 2 illustrates a flowchart 200 representative of one embodiment of a method for communications between a telematics call center and a telematics unit, in accordance with the present invention. The method begins at 201.

During step 210, a service communication is initiated from the telematics unit to the telematics call center responsive to user input. The service communication is initiated when the telematics subscriber places a service call to the telematics call center using an in-vehicle phone or when the telematics subscriber presses a button on the telematics unit. Service communications also comprise service activation calls, customer service inquiries, billing communications, and any other call between a telematics subscriber and a telematics call center.

During step 220 a text-based acknowledgement is received at the telematics unit in response to the initiated service communication. An example of a text-based acknowledgment is the message: "Connected to the call center. How may I help you?" The text-based acknowledgment is a text message entered on a text-input device, such as a keyboard, at the call center by the communication services advisor or the communications services manager and sent to the telematics unit over a wireless connection. In another embodiment the text-based acknowledgment includes predefined messages stored in a database at the call center and sent to the telematics unit over a wireless connection.

During step 230, the text-based acknowledgment is forwarded to a visual communication interface within the MVCU 110. Examples of visual communication interfaces are a radio display, a heads-up display, a driver information center, a TTY/TDD display, and an instrument panel. The visual communication interface allows the subscriber to verify that connection of the service communication was successful and that the call center is available to service the subscriber's request. The visual communication interface allows hearing-impaired drivers access to telematics services.

During step 240, the communication preference data is supplied to the call center. Any of a number of methods can be used to supply the communication preference data to the call center. The communication preference data allows the call center to determine what communication mode the subscriber would like to use to conduct the service communication.

In one embodiment the communication preference data is contained in a saved user profile. During step 242 the communication preference data is provided as a record in a saved subscriber profile. The subscriber profile is saved in the memory of the telematics unit. The subscriber profile can be supplied to the call center and saved in a database at the call center. The subscriber profile includes a plurality of records, each record comprising a parameter and a value associated with that parameter.

An example of a parameter that is associated with the record containing communication preference data is the "language" parameter. In another embodiment a different parameter is used. Values associated with a parameter are defined by the call center and identify a particular communication preference. Examples of values associated with the "language" parameter, which indicate a subscriber prefers text-based communication, include "TDD," "TTY," "text," "voice-carryover," and "hearing carryover." For example, the "voice carryover" value indicates that the subscriber wants to receive text messages but send voice messages. In another example, the "text" value indicates the subscriber wants to both receive and send text-only messages. The subscriber can, of course, also use the standard voice/voice communication if desired.

In another embodiment, the communication preference data is included with initiating the communication from the telematics unit to the call center. During step 244, communication preference data is included with initiation of the service communication. In one embodiment, the service communication is initiated by use of a TTY/TDD in the vehicle. Use of a particular TTY/TDD embodies the communication preference data. Detection of the TTY/TDD device type when the service communication is initiated is used by the call center to determine the communication preference data. An example is use of a standard TTY/TTD device that includes a keyboard and a display screen. One method of detecting a TTY/TDD device is accomplished by identifying the 1400 Hz to 1800 Hz operating range of the TTY/TDD device. In another embodiment, a device other than a TTY/TDD is coupled to the telematics unit or in-vehicle mobile phone to assist a hearing- or speech-disabled subscriber and is detected by reference to a database record listing a subscriber's installed hardware.

In another embodiment, the communication preference data is sent in response to the text-based acknowledgment. During step 246, after the subscriber receives the text-based acknowledgment, the subscriber sends a response that includes the communication preference data. In one embodiment, the communication preference data is indicated in a message, sent in response to the text-based acknowledgment, explicitly stating the communication preference data. In another embodiment, the communication preference data is determined by the method used to respond to the text-based acknowledgment. In one example, if the response to the text-based acknowledgment is a text message, the call center will continue the service communication sending and receiving text messages.

During step 250, a communication mode is established in accordance with communication preference data supplied to the call center. The communication mode is selected from the group consisting of a text/text communication, a text/voice communication, a voice/text communication, and a voice/voice communication. If the subscriber prefers to send and receive text-based communications, the service communication is established in a text/text communication mode. An example of when this mode is used is if the subscriber is hearing impaired and also cannot speak clearly or at all. When the subscriber chooses to receive text communications and to send voice communications, a text/voice communication mode is established. An example of when this mode is used is with a hearing-impaired subscriber who can speak. If the subscriber chooses to send and receive voice communications, a voice/voice communication mode is established. A subscriber can also choose to receive voice communications and send text communications, and the service communication is established in a voice/text communication mode. Each of these communication modes can be made available to a particular subscriber. In one embodiment, all subscribers are offered a selection among these communication modes.

During step 295, the flow of flowchart 200 is terminated.

The present invention can also take the form of a computer usable medium including computer program code for communicating between a telematics call center and a telematics unit. The program stored in the computer usable medium includes computer program code for executing the method steps diagrammed in FIG. 2 and described above.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

What is claimed is:

1. A method for communicating between a telematics call center and a telematics unit, the method comprising the steps of:
   (a) sending a communication from the telematics unit to the telematics call center, wherein the communication is sent in response to a user input;
   (b) sending a text-based acknowledgement from the telematics call center to the telematics unit, wherein the text-based acknowledgement is sent in response to the communication of step (a);
   (c) obtaining communication preference data from a web-hosting portal; and
   (d) establishing a communication mode between the telematics call center and the telematics unit, wherein the communication mode is established in accordance with the communication preference data obtained in step (c) and is selected from the group consisting of: a text/text communication mode, a text/voice communication mode, a voice/text communication mode, and a voice/voice communication mode.

2. The method of claim 1, wherein step (c) further includes storing the communication preference data to a saved user profile that is saved in memory of the telematics unit.

3. The method of claim 2, wherein step (c) further includes sending the communication preference data from the telematics unit to the telematics call center, and the communication preference data is sent in response to the text-based acknowledgement of step (b).

4. The method of claim 2, wherein step (a) further includes sending the communication from the telematics unit to the telematics call center, and the communication includes the communication preference data obtained in step (c).

5. The method of claim 1, wherein step (c) further includes obtaining the communication preference data from a saved user profile that is saved at the web-hosting portal, and sending the communication preference data from the web-hosting portal to the telematics unit or the telematics call center.

6. The method of claim 1, wherein step (c) further includes storing communication preference data to a saved user profile that is saved at the telematics call center.

7. A method for communicating between a telematics call center and a telematics unit, the method comprising the steps of:
  (a) sending a communication from the telematics unit to the telematics call center, wherein the communication is sent in response to a user input;
  (b) obtaining communication preference data from a web-hosting portal;
  (c) sending the communication preference data from the web-hosting portal to the telematics call center or to the telematics unit; and
  (d) establishing a communication mode between the telematics call center and the telematics unit, wherein the communication mode is established in accordance with the communication preference data obtained in step (c) and is selected from the group consisting of: a text/text communication mode, a text/voice communication mode, a voice/text communication mode, and a voice/voice communication mode.

8. The method of claim 7, wherein step (d) further includes establishing a communication mode between the telematics call center and the telematics unit, wherein the communication mode is established in accordance with the communication preference data obtained in step (c) and is selected from the group consisting of: a text/text communication mode, a text/voice communication mode, a voice/text communication mode, and a voice/voice communication mode.

9. A method for communicating between a telematics call center and a telematics unit, the method comprising the steps of:
  (a) sending a communication from the telematics unit to the telematics call center, wherein the communication is sent in response to a user input;
  (b) sending a text-based acknowledgement from the telematics call center to the telematics unit, wherein the text-based acknowledgement is sent over a wireless carrier system and is sent in response to the communication of step (a);
  (c) obtaining communication preference data originally received via a web-hosting portal and that is saved in memory of the telematics unit;
  (d) sending the communications preference data from the telematics unit to the telematics call center, wherein the communications preference data is sent over the wireless carrier system and is sent in response to the text-based acknowledgement of step (b); and
  (e) establishing a communication mode between the telematics call center and the telematics unit, wherein the communication mode is established in accordance with the communication preference data obtained in step (c) and is selected from the group consisting of: a text/text communication mode, a text/voice communication mode, a voice/text communication mode, and a voice/voice communication mode.

* * * * *